United States Patent [19]
Hurd et al.

[11] 3,798,987
[45] Mar. 26, 1974

[54] SPINDLE ASSEMBLY

[75] Inventors: David D. Hurd, Springfield; Robert B. Mead, Wilmington, both of Ohio

[73] Assignee: Boise Cascade Corporation, Boise, Idaho

[22] Filed: Oct. 6, 1972

[21] Appl. No.: 295,519

[52] U.S. Cl............................................. 74/230.01 R
[51] Int. Cl............................................. F16h 55/36
[58] Field of Search..... 74/230.01 R; 287/52, 52.07; 308/139, 149, 156

[56] References Cited
UNITED STATES PATENTS

| | | | |
|---|---|---|---|
| 2,320,901 | 6/1943 | Webster | 74/230.01 X |
| 3,494,208 | 2/1970 | Alagna | 74/230.01 |

*Primary Examiner*—Leonard H. Gerin
*Assistant Examiner*—Frank H. McKenzie, Jr.
*Attorney, Agent, or Firm*—Lawrence E. Laubscher

[57] ABSTRACT

A spindle assembly is disclosed for rotatably connecting a mower blade with a lawn mower housing. The spindle assembly includes a casing containing a through bore, a standard hex head bolt journalled within the casing, and a blade adapter member having a non-circular recess for non-rotatably engaging the hex head of the bolt. The spindle assembly also includes a drive pulley non-rotatably connected with the opposite end of the bolt, spacer means between the adapter and pulley, and a nut screw threaded to the bolt to displace the drive pulley and adapter inwardly into engagement with opposite ends of the spacer means, thereby to connect as an integral unit the spacer means, bolt, adapter and drive pulley. In a first embodiment of the invention, the pulley means includes a single blade sheave keyed to the bolt member. In a second embodiment of the invention, the pulley means includes a pair of blade sheaves keyed to the bolt and separated by a spacer sleeve to increase the torque transmitting capacity of the spindle assembly.

7 Claims, 3 Drawing Figures

SPINDLE ASSEMBLY

BACKGROUND OF THE INVENTION

1. Field of the Invention

This invention relates generally to a spindle assembly adapted for rotatably connecting a mower blade with a lawn mower housing.

2. Description of the Prior Art

A solution to the problem of providing a safe and economical mounting for the rotatable cutter blade of a mower has long been sought by lawn mower manufacturers. While many approaches to this problem have been proposed, no totally satisfactory solution which meets the conflicting demands of safety, ease of operation and low cost has been disclosed heretofore. One attempt to solve this problem is disclosed in U.S. Pat. No. 2,793,484 issued May 28, 1957 to McNeil et al. wherein a hub unit for the horizontal cutting member of a rotary lawn mower is disclosed. The hub unit includes a hub keyed to the vertical drive shaft of the mower, whereby the blade may be secured to the hub by screw means. While satisfactory for the intended purpose, the mounting of a mower blade directly to the drive shaft of a mower does not represent the ultimate solution since significant damage to the drive shaft may result if the blade strikes a solid object. One solution to the problem would be to mount the mower blades on a separate spindle shaft which is rotatably secured to the mower housing. General implementation of this solution, however, has been hampered by the significant cost of providing an additional rotatable shaft in the mower assembly.

Numerous techniques are known for lowering the cost of manufacturing journalled shafts such as by using bearing shims to reduce required machining as disclosed in U.S. Pat. No. 2,992,868 issued July 18, 1961 to Vacha. It is also known to provide a non-rotatable connection between one end of a shaft or bolt and an indented member through which the shank of the shaft extends as disclosed in U.S. Pat. No. 2,394,666 to Cloedy et a. However, inspite of these general teachings, there has been no disclosure, heretofore, of an economical spindle assembly especially adapted for rotatably journalling a mower blade to the housing of a mower which combines both ruggedness and safety with low cost and ease of assembly.

SUMMARY OF THE INVENTION

It is a primary object of this invention to provide a spindle assembly particularly adapted for mounting a mower blade which overcomes the above noted deficiencies of the prior art.

It is another object of this invention to provide a spindle assembly designed to employ standard machine elements. thereby minimizing the expense of manufacture.

Still another object of the invention is to provide a spindle assembly including, in combination, a casing adapted for connection with a fixed support and a bolt member having an enlarged head, such as a standard hex head bolt, journalled in the casing. Also included in the spindle assembly is an adapter member mounted on the bolt shank adjacent the head thereof, a first drive pulley non-rotatably connected with the opposite end of the bolt member, spacer means arranged between the adapter member and pulley member, and nut means connected with the bolt member for displacing the adapter and pulley members inwardly into engagement with opposite ends of the spacer means, thereby to connect as an integral unit the spacer means with the bolt, adapter and pulley members.

Another object of this invention is to provide a spindle assembly wherein the adapter member includes a central portion containing an opening for receiving the shank portion of the bolt member and, on the surface of the adapter remote from the casing, a non-circular concave recess corresponding with and at least partially receiving the bolt head.

Another object of this invention is to provide a spindle assembly wherein the adapter member includes a radially extending portion adapted for connection with a mower blade.

Still another object of this invention is to provide a pair of roller bearings having inner and outer races wherein the outer races are received in counterbores at opposite ends, respectively, of the casing and the inner races are tightly mounted on the shank portion of the bolt member by means of tubular liners adapted to shim the space between each inner race and the corresponding bolt shank portion.

Still another object of this invention is to provide a spindle assembly wherein the spacer means between the first drive pulley and the adapter includes the inner races of said bearings and a first spacer sleeve concentrically mounted on the shank portion and in contiguous engagement at opposite ends with the inner races, respectively.

An additional object of this invention is to provide a second drive pulley member between the nut and the first pulley member in axially spaced relation to the first pulley member. The spacer means further including a second spacer sleeve arranged between and in contiguous engagement at opposite ends with the first and second pulley members.

Other and additional objects of this invention will appear upon consideration of the following description of the invention.

DESCRIPTION OF THE PREFERRED EMBODIMENTS

Figure 1:
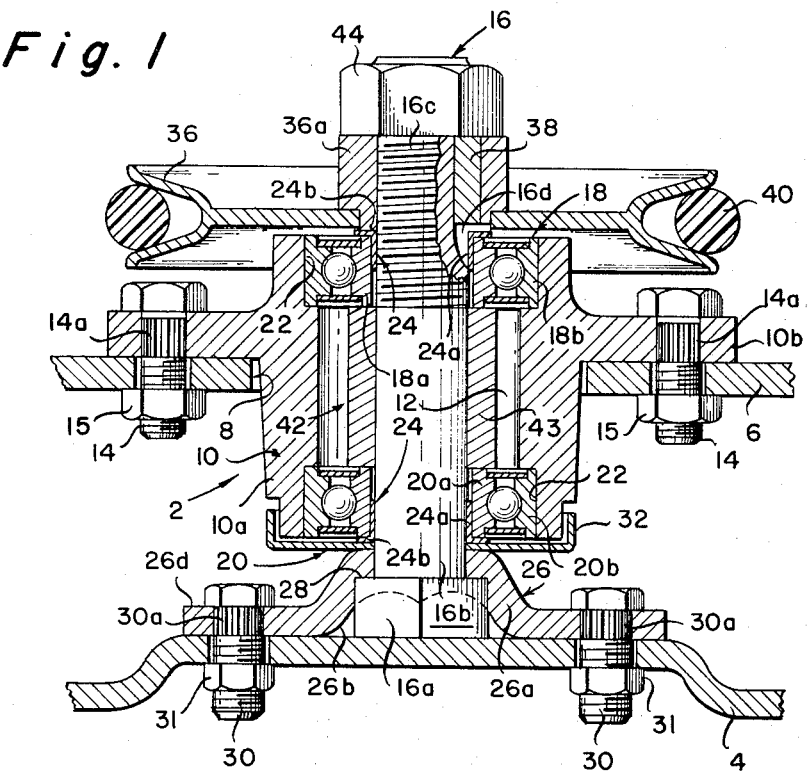
FIG. 1 is a cross sectional view of the spindle assembly of the invention for rotatably mounting a mower blade with respect to a mower housing, wherein the housing and blade are only partially illustrated.

With reference to FIG. 1, a spindle assembly 2 is illustrated for rotatably mounting a mower blade 4 to a mower housing 6 containing an opening 8, the blade and housing being only partially illustrated. The spindle assembly includes casing 10 having a central tubular portion 10a containing a through bore 12. Connected with the central portion 10a is a circular radial flange 10b adapted for connection with the mower housing, whereby bore 12 is aligned with opening 8. As illustrated in FIG. 1, the central tubular portion 10a may even be disposed within opening 8 of the mower housing. The radial flange 10b is secured to the mower housing by means of a plurality of bolts 14 and nuts 15. Each bolt extends through corresponding holes in the flange and housing, respectively. The shank portion of each bolt may be provided with a knurled surface 14a for interlocking engagement with the flange 10b.

Journalled within casing 10 is a standard hex head bolt 16 including an enlarged six sided head portion 16a, shank portion 16b and threaded end portion 16c having a keyway 16d cut therein (illustrated in partial cutaway).

Shank portion 16b of bolt 16 is journalled with casing 10 by means of a pair of roller bearings 18, 20 including inner and outer races 18a, 20a and 18b, 20b, respectively. Outer races 18b, 20b are received, respectively, within counterbores 22 located at each end of casing 10. To permit the use of standard hex head bolts and roller bearings, liner means 24 of varying thickness are provided for shimming the space between each of the inner races 18a, 20a and the corresponding bolt shank portion. Each liner means 24 includes a generally tubular sleeve portion 24a and a radially extending flange portion 24b.

Figure 2:
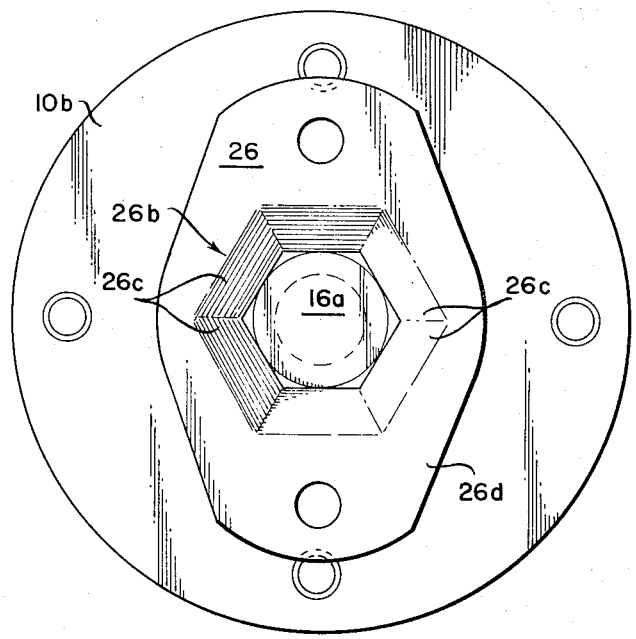
FIG. 2 is a bottom elevational view of the spindle assembly of FIG. 1 illustrating the assembly without the blade and housing.

To connect the mower blade 4 with the bolt member 16, an adapter member 26 is provided for mounting on the bolt shank portion 16b adjacent the head portion 16a. The adapter member 26 includes a central portion 26a containing an opening receiving the shank portion 16b of the bolt member. The central portion also contains on the surface remote from the casing a non-circular concave recess 26b corresponding with and at least partially receiving the bolt head portion, thereby to prevent rotation of the adapter member relative to the bolt. As illustrated in FIG. 2, the recess portion is defined by a plurality of planar sections 26c corresponding to and adapted for engagement with the planar surfaces 28 of the enlarged head portion 16a of bolt member 16. Sections 26c may be rounded and inclined inwardly slightly to insure a tight engagement with the angularly arranged surfaces of the hexagonal head portion of the bolt member.

Adapter 26 further includes a radially extending second portion 26d adapted for connection with said mower blade by means of bolts 30 received in aligned holes of the second portion and blade. Bolts 30 have knurled shank portion 30a similar to bolts 14 for securing blade 4 to the second portion 26d. The depth a of recess 26b may be exactly equal or slightly less than the axial extent of head portion 16a, whereby the adapter, blade and bolt member may be slightly held in an integral unit as bolts 30 are secured by means of nuts 31.

Secured to the threaded portion 16c of bolt 16 is a blade sheave or pulley 36 having a central hub portion 36a keyed to the pulley by key 38. Pulley 36 is adapted to receive rotational energy from a mower engine by means of a belt 40.

Arranged between adapter 26 and the inner race of bearing 20 is a washer cup 32 which is spaced out of frictional engagement with the casing 10 by a radial portion 24b of liner means 24. In a similar manner, radial portion 24b of the liner means associated with bearing 18 is adapted to space pulley 36 out of engagement with the other end of casing 10.

In order to permit the entire spindle assembly to be drawn together into an integral unit, spacer means 42 are arranged between the adapter 26 and pulley 36 thereby allowing a nut 44 to displace the adapter and pulley members inwardly into engagement with opposite ends of the spacer means. The spacer means 42 includes the inner races 18a, 20a of the pair of bearings and a spacer sleeve 43 concentrically mounted on the shank portion 16b and in contiguous engagement at opposite ends with the inner races, respectively.

Figure 3:
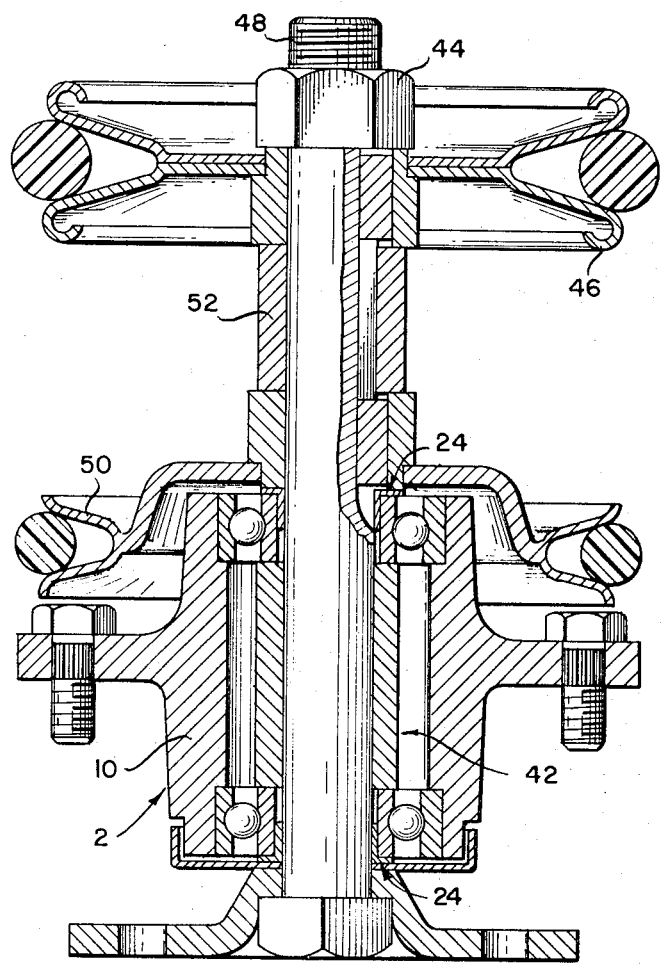
FIG. 3 is a cross sectional view of a second embodiment of the spindle assembly of the subject invention.

In a second embodiment illustrated in FIG. 3, increased torque transmitting capability is obtained by including a second pulley 46 keyed to bolt 48 between first pulley 50, corresponding to pulley 36, and nut 44. A second spacer sleeve 52 is arranged concentrically about bolt 48 between pulleys 46, 50. In all other respects, the embodiment of FIG. 3 is identical with the embodiment of FIG. 1. Accordingly, the entire assembly may be drawn into an integral unit by means of nut 44.

A spindle assembly has been disclosed which satisfies the need for an inexpensive yet rugged and safe apparatus for rotatably mounting a mower blade with respect to a mower housing. Maximum use is made of standard machine elements. Accordingly, the shaft may be formed of a standard hex head bolt modified only by a keyway formed in the threaded end thereof. Furthermore, by employing tubular liners 24, standard dimension roller bearings may be used without expensive machining, thereby further reducing manufacturing costs.

What is claimed is:

1. A spindle assembly for lawn mowers and the like, comprising
   a. a casing (10) adapted for connection with a fixed support, said casing containing a through bore;
   b. a bolt member (16) having a central shank portion (16b) journalled in said casing, said bolt member having at opposite ends an enlarged polygonal head portion (16a) and a screw threaded portion (16c), respectively;
   c. an adapter member (26) mounted on said bolt shank portion adjacent said head portion, said adapter member including
      1. a central portion (26a) containing an opening receiving said bolt shank portion, said central portion containing on the surface thereof remote from said casing a non-circular concave recess corresponding with and at least partially receiving said bolt head portion, thereby to prevent rotation of said adapter member relative to said bolt; and
      2. a second portion (26d) adapted for connection with a rotatably driven member;
   d. a first drive pulley member (36) non-rotatably connected with said screw thread portion;
   e. spacer means (42) arranged between said adapter member and pulley members; and
   f. nut means (44) connected with the extremity of said screw thread portion for displacing said adapter and pulley members inwardly into engagement with opposite ends of said spacer means, thereby to connect as an integral unit with said spacer means said bolt, adapter and pulley members.

2. Apparatus as defined in claim 1, and further including a pair of bearing means (18,20) connected with said casing at opposite ends of said bore, respectively, said bearing means rotatably supporting said bolt shank portion relative to said casing, each of said bearing means including concentrically arranged inner races (18a, 20a) and outer races (18b, 20b); and further wherein said spacer means comprises the inner races of said pair of bearing means, and a first spacer sleeve (43) concentrically mounted on said shank portion and in contiguous engagement at opposite ends with said inner races, respectively.

3. Apparatus as defined in claim 2, and further including liner means (24) for shimming the spaces between each of said inner races and the corresponding bolt shank portion.

4. Apparatus as defined in claim 3, wherein said liner means comprises a tubular sleeve (24a) arranged concentrically between said bolt shank portion and the corresponding inner race.

5. Apparatus as defined in claim 2, wherein said casing contains at opposite ends of said bore counterbored recesses (22) for receiving the outer races of said bearing means, respectively.

6. Apparatus as defined in claim 2, and further including a second pulley member (46) mounted on said threaded portion between said nut means and said first pulley member and in axially spaced relation to said first pulley member, said spacer means further including a second spacer sleeve (52) arranged between and in contiguous engagement at opposite ends with said first and second pulley members, respectively.

7. A spindle assembly for rotatably connecting a mower blade with a lawn mower housing containing an opening, comprising a. a casing (10) containing a through bore, said casing having an external flange portion (16b) adapted for connection with said housing to cause said bore to be in communication with said opening;

b. a bolt member (16) having a central shank portion journalled in said casing, said bolt member having at opposite ends an enlarged polygonal head portion (16a) and a screw threaded portion (16c), respectively, said screw threaded portion containing a key slot;

c. an adapter member (26) mounted on said bolt shank portion adjacent said head portion, said adapter member including 1. a central portion (26a) containing an opening receiving said bolt shank portion, said central portion containing on the surface thereof remote from said casing a non-circular concave recess corresponding with and at least partially receiving said bolt head portion, thereby to prevent rotation of said adapter member relative to said bolt; and 2. a radially extending second portion (26d) adapted for connection with said mower blade;

d. drive pulley means (36) non-rotatably keyed to said screw thread portion;

e. spacer means (42) arranged between said adapter member and said pulley means; and f. nut means (44) connected with the extremity of said screw thread portion for displacing said adapter member and said pulley means inwardly into engagement with opposite ends of said spacer means, thereby to connect as an integral unit with said spacer means, said bolt and adapter means and said pulley means.

* * * * *